US011905394B2

(12) United States Patent
Feng et al.

(10) Patent No.: US 11,905,394 B2
(45) Date of Patent: Feb. 20, 2024

(54) CELLULOSE ESTER AND IMPACT MODIFIER COMPOSITIONS AND ARTICLES MADE USING THESE COMPOSITIONS

(71) Applicant: Eastman Chemical Company, Kingsport, TN (US)

(72) Inventors: Wenlai Feng, Johnson City, TN (US); Thomas Joseph Pecorini, Kingsport, TN (US); Michael Eugene Donelson, Kingsport, TN (US); Haining An, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 15 days.

(21) Appl. No.: 17/449,837

(22) Filed: Oct. 4, 2021

(65) Prior Publication Data

US 2022/0025158 A1 Jan. 27, 2022

Related U.S. Application Data

(63) Continuation of application No. 16/348,573, filed as application No. PCT/US2017/060765 on Nov. 9, 2017, now Pat. No. 11,230,635.

(60) Provisional application No. 62/513,467, filed on Jun. 1, 2017, provisional application No. 62/505,261, filed on May 12, 2017, provisional application No. 62/420,989, filed on Nov. 11, 2016.

(51) Int. Cl.
*C08L 1/14* (2006.01)
*C08J 5/18* (2006.01)
*C08L 1/10* (2006.01)
*C08K 5/00* (2006.01)

(52) U.S. Cl.
CPC . *C08L 1/14* (2013.01); *C08J 5/18* (2013.01); *C08L 1/10* (2013.01); *C08J 2301/14* (2013.01); *C08J 2433/00* (2013.01); *C08K 5/0016* (2013.01)

(58) Field of Classification Search
CPC ............... C08L 1/10; C08L 1/12; C08L 1/14
See application file for complete search history.

(56) References Cited

U.S. PATENT DOCUMENTS

| | | | |
|---|---|---|---|
| 1,683,347 A | 9/1928 | Gray et al. |
| 1,698,049 A | 1/1929 | Clarke et al. |
| 1,880,560 A | 10/1932 | Webber et al. |
| 1,880,808 A | 10/1932 | Clarke et al. |
| 1,984,147 A | 12/1934 | Malm |
| 2,129,052 A | 9/1938 | Fordyce |
| 3,448,173 A | 6/1969 | Ryan et al. |
| 3,617,201 A | 11/1971 | Berni et al. |
| 3,655,825 A | 4/1972 | Souder et al. |
| 3,853,968 A | 12/1974 | Bortnick et al. |
| 3,948,674 A | 4/1976 | Coaker et al. |
| 4,080,356 A | 3/1978 | Gergen et al. |
| 4,147,603 A | 4/1979 | Pacifici et al. |
| 4,263,183 A | 4/1981 | Light et al. |
| 4,446,585 A | 5/1984 | Harding et al. |
| 4,758,645 A | 7/1988 | Miyazono et al. |
| 4,839,230 A | 6/1989 | Cook |
| 4,861,629 A | 8/1989 | Nahm |
| 5,082,914 A | 1/1992 | Cook et al. |
| 5,182,379 A | 1/1993 | Cook et al. |
| 5,292,877 A | 3/1994 | Edgar et al. |
| 5,302,637 A | 4/1994 | Landry et al. |
| 5,384,163 A | 1/1995 | Budde et al. |
| 5,534,594 A | 7/1996 | Troy et al. |
| 5,723,151 A | 3/1998 | Cook et al. |
| 5,741,901 A | 4/1998 | Cook et al. |
| 5,750,677 A | 5/1998 | Edgar et al. |
| 5,871,573 A | 2/1999 | Cook et al. |
| 5,981,738 A | 11/1999 | Cook et al. |
| 6,331,580 B1 | 12/2001 | Molnar |
| 6,369,214 B1 | 4/2002 | Tye et al. |
| 10,919,984 B2 | 2/2021 | Feng et al. |
| 11,230,635 B2 | 1/2022 | Feng et al. |
| 2005/0228084 A1 | 10/2005 | Buchanan et al. |
| 2006/0058425 A1 | 3/2006 | Mohanty et al. |
| 2008/0118765 A1 | 5/2008 | Dorgan et al. |
| 2009/0286905 A1 | 11/2009 | Flexman et al. |
| 2010/0015456 A1 | 1/2010 | Lizotte et al. |
| 2010/0144971 A1 | 6/2010 | Babcock et al. |
| 2012/0101190 A1 | 4/2012 | Okoshi et al. |
| 2016/0068656 A1 | 3/2016 | Budhavaram et al. |
| 2016/0090471 A1 | 3/2016 | Yao et al. |
| 2016/0090473 A1 | 3/2016 | Yao et al. |

(Continued)

FOREIGN PATENT DOCUMENTS

IT      MI 951 049 A1    11/1996
JP      2005515285 A      5/2005

(Continued)

OTHER PUBLICATIONS

Machine Translation of JP-2015218252-A (Year: 2021).*
Machine Translation of JP-2015044975-A (Year: 2020).*
Machine Translation of JP-2009114371-A (Year: 2020).*
ASTM D648; "Standard Test Method for Deflection Temperature of Plastics Under Flexural Load in the Edgewise Position"; Apr. 2018.
ASTM D256; "Standard Test Methods for Determining the Izod Pendulum Impact Resistance of Plastics"; Nov. 2018.
ASTM D638; "Standard Test Methods for Tensile Properties of Plastics"; Mar. 2015.
ASTM D790; "Standard Test Methods for Flexural Properties of Unreinforced and Reinforced Plastics and Electrical Insulating Materials"; Jul. 2017.

(Continued)

*Primary Examiner* — Liam J Heincer
(74) *Attorney, Agent, or Firm* — Robert C. Morriss

(57) ABSTRACT

A cellulose ester composition is provided comprising at least one cellulose ester and at least one impact modifier and optionally at least one plasticizer. Processes for producing the cellulose ester compositions as well as articles made using these compositions, such as eyeglass frames, automotive parts, and toys are also provided.

12 Claims, No Drawings

(56) References Cited

U.S. PATENT DOCUMENTS

| | | | |
|---|---|---|---|
| 2019/0256613 | A1 | 8/2019 | Pecorini et al. |
| 2019/0345313 | A1 | 11/2019 | Feng et al. |
| 2019/0359793 | A1 | 11/2019 | Feng et al. |
| 2019/0359794 | A1 | 11/2019 | An et al. |
| 2020/0071499 | A1 | 3/2020 | Miyazaki et al. |

FOREIGN PATENT DOCUMENTS

| | | | | |
|---|---|---|---|---|
| JP | 2007161943 | A | | 6/2007 |
| JP | 2007284571 | A | | 11/2007 |
| JP | 2007291229 | A | | 11/2007 |
| JP | 2008019302 | A | | 1/2008 |
| JP | 2008133445 | A | | 6/2008 |
| JP | 2009114371 | A | * | 5/2009 |
| JP | 2009167253 | A | | 7/2009 |
| JP | 2010126637 | A | | 6/2010 |
| JP | 2010243935 | A | | 10/2010 |
| JP | 2011195787 | A | | 10/2011 |
| JP | 2012144713 | A | | 8/2012 |
| JP | 2014084343 | A | | 5/2014 |
| JP | 2015044975 | A | * | 3/2015 |
| JP | 2015113417 | A | | 6/2015 |
| JP | 2015218252 | A | * | 12/2015 |
| WO | WO 2003/062314 | A1 | | 7/2003 |
| WO | WO 2005/111184 | A2 | | 11/2005 |
| WO | WO 2011/062781 | A1 | | 5/2011 |
| WO | WO 2011/078272 | A1 | | 6/2011 |
| WO | WO 2011/078286 | A1 | | 6/2011 |
| WO | WO 2012/005207 | A1 | | 1/2012 |
| WO | WO 2012/005208 | A1 | | 1/2012 |

OTHER PUBLICATIONS

ASTM D3418; "Standard Test Method for Transition Temperatures and Enthalpies of Fusion and Crystallization of Polymers by Differential Scanning Calorimetry"; Jun. 2015.
ASTM D4440; "Standard Test Method for Plastics: Dynamic Mechanical Melt Rheology"; Feb. 2015.
ASTM D1003; "Standard Test Method for Haze and Luminous Transmittance of Transparent Plastics"; Nov. 2013.
ASTM E1348; "Standard Test Method for Transmittance and Color by Spectrophotometry Using Hemispherical Geometry"; Nov. 2015.
ASTM D6866; "Standard Test Methods for Determining the Biobased Content of Solid, Liquid, and Gaseous Samples Using Radiocarbon Analysis"; Mar. 2018.
ASTM D5296; "Standard Test Method for Molecular Weight Averages and Molecular Weight Distribution of Polystyrene by High Performance Size-Exclusion Chromatography".
ASTM D6474; "Standard Test Method for Determining Molecular Weight Distribution and Molecular Weight Average of Polyolefins by High Temperature Gel Permeation Chromatography" Dec. 2012.
ASTM D2990; "Standard Test Methods for Tensile, Compressive, and Flexural Creep and Creep-Rupture of Plastics"; Mar. 2017.
Shelton, Michael C.; "Cellulose Esters, Inorganic Esters"; Kirk-Othmer Encyclopedia of Chemical Technology, 5th edition, vol. 5 (2004), pp. 394-412.
Gedon, Steven, et al.; "Cellulose Esters, Organic Esters"; Kirk-Othmer Encyclopedia of Chemical Technology, $5^{th}$ edition, vol. 5 (2004), pp. 412-444.
Notification of Transmittal of The International Search Report and The Written Opinion of The International Searching Authority, or the Declaration; International Application No. PCT/US2017/060803 with an International Filing Date of Nov. 9, 2017.
Notification of Transmittal of The International Search Report and The Written Opinion of The International Searching Authority, or the Declaration; International Application No. PCT/US2017/060765 with an International Filing Date of Nov. 9, 2017.
Notification of Transmittal of The International Search Report and The Written Opinion of The International Searching Authority, or the Declaration; International Application No. PCT/US2017/060823 with an International Filing Date of Nov. 9, 2017.
The Dow Company: "Paraloid Acrylic Impact Modifier Platform for Profiles", 2008, XP002777924, URL:https://www.dow.com/assets/attachments/business/pbm/paraloid_km.shared_tds/paraloid.pdf.
Rohm and Haas: "Paraloid KM-355 Acrylic Impact Modifier", 2006, XP002777925, URL:https://www.dow.com/assets/attachments/business/pbm/paraloid_km/paraloid_km-355/tds/paraloid_km-355.pdf.
Co-pending U.S. Appl. No. 16/348,586, filed May 9, 2019; Feng et al.
Co-pending U.S. Appl. No. 16/348,550, filed May 9, 2019; Feng et al.
Co-pending U.S. Appl. No. 16/348,573, filed Nov. 9, 2017; Feng et al.
Office Action dated Apr. 15, 2020 received in co-pending U.S. Appl. No. 16/348,550.
Office Action dated Oct. 8, 2020 received in co-pending U.S. Appl. No. 16/348,573.
Notice of Allowance dated Oct. 15, 2020 received in co-pending U.S. Appl. No. 16/348,550.
Office Action dated Mar. 26, 2021 received in co-pending U.S. Appl. No. 16/348,573.
Notice of Allowance dated Sep. 14, 2021 received in co-pending U.S. Appl. No. 16/348,573.
Office Action dated Aug. 5, 2022 received in co-pending U.S. Appl. No. 16/348,586.
Notice of Allowance dated Jan. 11, 2023 received in co-pending U.S. Appl. No. 16/348,586.

* cited by examiner

CELLULOSE ESTER AND IMPACT MODIFIER COMPOSITIONS AND ARTICLES MADE USING THESE COMPOSITIONS

FIELD OF THE INVENTION

This invention belongs to the field of cellulose ester chemistry, particularly to cellulose esters comprising impact modifiers and optionally, plasticizers. The invention also belongs to a field of cellulose ester compositions comprising at least one impact modifier and optionally at least one plasticizer. Processes for producing these cellulose ester compositions as well as plastic articles made using these compositions, such as eyeglass frames, automotive parts, and toys are also provided.

BACKGROUND OF THE INVENTION

Cellulose acetate compositions typically have a heat deflection temperature (HDT) of less than 90° C. Commercially available cellulose esters that are utilized in thermoforming articles typically contain significant amounts of plasticizer to allow for processing and to impart sufficient toughness to the molded article. However, the addition of plasticizer has drawbacks, as it will decrease the HDT relative to the base cellulose ester and limit the use of the cellulose ester materials to applications that can accommodate an HDT below about 90° C. Also, cellulose ester molded articles can experience plasticizer exudation during use.

It would be beneficial to be able to provide melt processable cellulose ester compositions that do not have such drawbacks.

BRIEF SUMMARY OF THE INVENTION

Surprisingly, it had been discovered that compositions of cellulose esters can be prepared with HDTs exceeding 95° C. In embodiments of this invention, this can be achieved by reducing the amount of plasticizer and in certain embodiments completely eliminating the use of plasticizers in the compositions. The elimination of the plasticizer can eliminate the common problems associated with plasticizer exudation during use. However, reducing or eliminating the plasticizer can decrease the toughness of these high HDT cellulosic compositions. Surprisingly, it has been found that certain materials referred to as impact modifiers can restore the toughness of high HDT cellulosic compositions, even when added at relatively low levels, e.g. levels of about 2 wt % based on the total weight of the cellulose ester composition.

In certain embodiments, this invention relates to the dispersion of impact modifiers into cellulose ester compositions, in the form of small discrete particles in amounts sufficient to improve the mechanical and physical properties of the cellulose esters compositions. The impact modified cellulose esters, according to the invention, have the unique properties of being melt processable, having significantly higher HDTs relative to commercially available plasticized cellulose ester thermoplastics, have high modulus, good impact properties and good resistance to deformation under load.

In one embodiment of the invention, a cellulose ester composition is provided comprising at least one cellulose ester, at least one impact modifier, and optionally, at least one plasticizer.

In another embodiment of the invention, a cellulose ester composition is provided comprising at least one cellulose ester, at least one impact modifier, and at least one plasticizer.

In another embodiment of the invention, a process for producing the cellulose ester composition is provided comprising contacting at least one cellulose ester, at least one impact modifier, and optionally, at least one plasticizer, and blending the combination. In one embodiment, the plasticizer is present in an amount that does not substantially reduce the HDT of the cellulose ester composition compared to a similar composition without the plasticizer. In embodiments, the HDT does not change (e.g., reduce) more than 10%, or 5%, or 2%, as a result of including the plasticizer.

In one embodiment of the invention, cellulose ester compositions are described that contain no plasticizer, but contain 1-30 wt %, or 1-15 wt %, or 2-10 wt %, or 10-30 wt %, or 15-30 wt % impact modifier, based on the total weight of the cellulose ester composition, and have HDT values greater than 95° C., and have notched Izod impact strength values greater than 80 J/m.

In another embodiment of the invention, cellulose ester compositions are provided that contain no plasticizer, but are melt processable. In embodiments, the melt processable cellulose ester compositions contain 1-30 wt %, or 1-15 wt %, or 2-10 wt %, or 10-30 wt %, or 15-30 wt % impact modifier, based on the total weight of the cellulose ester composition, and have HDT values greater than 95° C., and notched Izod impact strength values greater than 80 J/m, and spiral flow values of at least 15 inches when measured at 240° C.

In another embodiment of the invention, the melt processable cellulose ester compositions contain 2 wt %-15 wt % impact modifier, based on the total weight of the cellulose ester composition, and have HDT values greater than 95° C., and notched Izod impact strength values greater than 80 J/m, and viscosities at 240° C. and 400 rad/sec less than 10,000 P.

In another embodiment, cellulose ester compositions are provided that have a total DS/AGU in the range from about 2 to about 2.99 and the DS/AGU of acetyl ranges from about 0 to about 2.2, with the remainder of the ester groups comprising propionyl, butyryl or combinations thereof.

In one embodiment of the invention, melt processable cellulose ester compositions are described that contain up to 15 wt % plasticizer, or up to 10 wt % plasticizer; 1-30 wt %, or 1-15 wt %, or 2-10 wt % impact modifier; and have HDT values greater than 95° C., and have notched Izod impact strength values greater than 80 J/m.

In another embodiment of the invention, melt processable cellulose ester compositions are described that contain up to 15 wt % plasticizer or up to 10 wt % plasticizer, based on the total weight of the cellulose ester composition; 1-30 wt %, or 1-15 wt %, or 2-10 wt % impact modifier, based on the total weight of the cellulose ester composition; and that have HDT values greater than 95° C., notched Izod impact strength values greater than 80 J/m, and spiral flow values of at least 15 inches when measured at 240° C.

In another embodiment of the invention, melt processable cellulose ester compositions are described that contain up to 15 wt % plasticizer or up to 10 wt % plasticizer, based on the total weight of the cellulose ester composition; 1-30 wt %, or 1-15 wt %, or 2-10 wt % impact modifier, based on the total weight of the cellulose ester composition; and that have HDT values greater than 95° C., notched Izod impact strength values greater than 80 J/m, and viscosities at 240° C. and 400 rad/sec less than 10,000 P.

In other embodiments, the melt processable cellulose ester compositions described above, optionally contain some plasticizer. In embodiments, the plasticizer is present in an amount that does not substantially reduce the HDT of the cellulose ester composition compared to a similar composition without the plasticizer. In embodiments, the HDT does not change (e.g., reduce) more than 10%, or 5%, or 2%, as a result of including the plasticizer.

In one embodiment of the invention, a cellulose ester composition is provided comprising at least one cellulose ester, at least one impact modifier, and optionally, at least one plasticizer. In one embodiment, the cellulose ester is CAP and the composition contains 0-5 wt %, 0-2 wt %, 0-less than 2 wt %, or 0-1 wt % plasticizer. In one embodiment, the cellulose ester is CAP and contains no plasticizer.

In another embodiment of the invention, a cellulose ester composition is provided comprising at least one cellulose ester, and at least one impact modifier and at least one plasticizer. In one embodiment, the cellulose ester is CA and contains 1-15 wt % plasticizer. In embodiments, the cellulose ester is CA and the composition contains 1-10 wt %, or 1-less than 10 wt %, or 1-9 wt % plasticizer.

DETAILED DESCRIPTION

In one embodiment of the invention, a cellulose ester composition is provided comprising at least one cellulose ester, at least one impact modifier, and optionally, at least one plasticizer.

In embodiments, the cellulose ester utilized in this invention can be any that is known in the art. Cellulose esters that can be used for the present invention generally comprise repeating units of the structure:

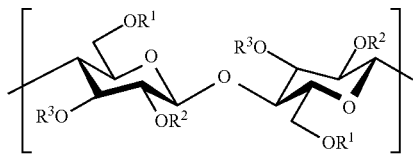

wherein $R^1$, $R^2$, and $R^3$ are selected independently from the group consisting of hydrogen or straight chain alkanoyl having from 2 to 10 carbon atoms. For cellulose esters, the substitution level is usually expressed in terms of degree of substitution (DS), which is the average number of non-OH substitutents per anhydroglucose unit (AGU). Generally, conventional cellulose contains three hydroxyl groups in each AGU unit that can be substituted; therefore, DS can have a value between zero and three. However, low molecular weight cellulose mixed esters can have a total degree of substitution slightly above 3 due to end group contributions. Native cellulose is a large polysaccharide with a degree of polymerization from 250-5,000 even after pulping and purification, and thus the assumption that the maximum DS is 3.0 is approximately correct. However, as the degree of polymerization is lowered, as in low molecular weight cellulose mixed esters, the end groups of the polysaccharide backbone become relatively more significant, thereby resulting in a DS that can range in excess of 3.0. Low molecular weight cellulose mixed esters are discussed in more detail subsequently in this disclosure. Because DS is a statistical mean value, a value of 1 does not assure that every AGU has a single substitutent. In some cases, there can be unsubstituted anhydroglucose units, some with two and some with three substitutents, and typically the value will be a non-integer. Total DS is defined as the average number of all of substituents per anhydroglucose unit. The degree of substitution per AGU can also refer to a particular substitutent, such as, for example, hydroxyl, acetyl, butyryl, or propionyl.

In embodiments, the cellulose ester utilized can be a cellulose triester or a secondary cellulose ester. Examples of cellulose triesters include, but are not limited to, cellulose triacetate, cellulose tripropionate, or cellulose tributyrate. Examples of secondary cellulose esters include cellulose acetate, cellulose acetate propionate, and cellulose acetate butyrate.

In one embodiment of the invention, the cellulose ester can be chosen from cellulose acetate (CA), cellulose propionate (CP), cellulose butyrate (CB), cellulose acetate propionate (CAP), cellulose acetate butyrate (CAB), cellulose propionate butyrate (CPB), cellulose acetate isobutyrate (CAIB), and the like, or combinations thereof. Examples of such cellulose esters are described in U.S. Pat. Nos. 1,698,049; 1,683,347; 1,880,808; 1,880,560; 1,984,147, 2,129,052; and 3,617,201, incorporated herein by reference in their entirety to the extent that they do not contradict the statements herein. In one embodiment, the cellulose ester is CAP.

In one embodiment of the invention, the cellulose ester can be chosen from cellulose propionate (CP), cellulose butyrate (CB), cellulose acetate propionate (CAP), cellulose acetate butyrate (CAB), cellulose propionate butyrate (CPB), cellulose tripropionate (CTP), or cellulose tributyrate (CTB), but not from cellulose acetate (CA).

In embodiments of the invention, the cellulose esters have at least 2 anhydroglucose rings and can have between at least 50 and up to 5,000 anhydroglucose rings. The number of anhydroglucose units per molecule is defined as the degree of polymerization (DP) of the cellulose ester. In embodiments, cellulose esters can have an inherent viscosity (IV) of about 0.2 to about 3.0 deciliters/gram, or about 0.5 to about 1.8, or about 1 to about 1.5, as measured at a temperature of 25° C. for a 0.25 gram sample in 100 ml of a 60/40 by weight solution of phenol/tetrachloroethane. Examples of cellulose esters include, but are not limited to, cellulose acetate, cellulose propionate, cellulose butyrate, cellulose acetate propionate (CAP), cellulose acetate butyrate (CAB), cellulose propionate butyrate, and the like. In embodiments, cellulose esters useful herein can have a DS/AGU of about 2 to about 2.99, and the substituting ester can comprise either acetyl, propionyl and butyryl, or any combinations of these. In another embodiment of the invention, the total DS/AGU ranges from about 2 to about 2.99 and the DS/AGU of acetyl ranges from about 0 to 2.2, with the remainder of the ester groups comprising propionyl, butyryl or combinations thereof.

In another embodiment of the invention, the total DS/AGU ranges from about 2 to about 2.99 and the DS/AGU of acetyl ranges from about 0 to 1.2, with the remainder of the ester groups comprising propionyl, butyryl or combinations thereof. In another embodiment of the invention, the total DS/AGU ranges from about 2 to about 2.99 and the DS/AGU of acetyl ranges from about 0 to 0.5, with the remainder of the ester groups comprising propionyl, butyryl or combinations thereof.

Cellulose esters can be produced by any method known in the art. Examples of processes for producing cellulose esters are taught in Kirk-Othmer, Encyclopedia of Chemical Technology, 5th Edition, Vol. 5, Wiley-Interscience, New York (2004), pp. 394-444. Cellulose, the starting material for producing cellulose esters, can be obtained in different grades and sources such as from cotton linters, softwood pulp, hardwood pulp, corn fiber and other agricultural sources, and bacterial cellulose, among others.

One method of producing cellulose esters is esterification of the cellulose by mixing cellulose with the appropriate organic acids, acid anhydrides, and catalysts. Cellulose is then converted to a cellulose triester. Ester hydrolysis is then performed by adding a water-acid mixture to the cellulose triester, which can then be filtered to remove any gel particles or fibers. Water is then added to the mixture to precipitate the cellulose ester. The cellulose ester can then be washed with water to remove reaction by-products followed by dewatering and drying.

The cellulose triesters to be hydrolyzed can have three substitutents selected independently from alkanoyls having from 2 to 10 carbon atoms. Examples of cellulose triesters include cellulose triacetate, cellulose tripropionate, and cellulose tributyrate or mixed triesters of cellulose such as cellulose acetate propionate, and cellulose acetate butyrate. These cellulose esters can be prepared by a number of methods known to those skilled in the art. For example, cellulose esters can be prepared by heterogeneous acylation of cellulose in a mixture of carboxylic acid and anhydride in the presence of a catalyst such as $H_2SO_4$. Cellulose triesters can also be prepared by the homogeneous acylation of cellulose dissolved in an appropriate solvent such as LiCl/DMAc or LiCl/NMP.

Those skilled in the art will understand that the commercial term of cellulose triesters also encompasses cellulose esters that are not completely substituted with acyl groups. For example, cellulose triacetate commercially available from Eastman Chemical Company, Kingsport, TN, U.S.A., typically has a DS from about 2.85 to about 2.99.

After esterification of the cellulose to the triester, part of the acyl substitutents can be removed by hydrolysis or by alcoholysis to give a secondary cellulose ester. As noted previously, depending on the particular method employed, the distribution of the acyl substituents can be random or non-random. Secondary cellulose esters can also be prepared directly with no hydrolysis by using a limiting amount of acylating reagent. This process is particularly useful when the reaction is conducted in a solvent that will dissolve cellulose. All of these methods yield cellulose esters that are useful in this invention.

In one embodiment, the secondary cellulose esters useful in the present invention have an absolute weight average molecular weight (Mw) from about 5,000 to about 400,000 as measured by gel permeation chromatography (GPC) according to ASTM D6474. The following method is used to calculate the absolute weight average molecular weight values (Mw) for CE. The solvent is THF stabilized with BHT Preservative. The instrumentation for the THF/cellulose ester procedure consists of the following Agilent 1200 series components: degasser, isocratic pump, auto-sampler, column oven, UV/Vis detector and a refractive index detector. The test temperature is 30° C. and flow rate is 1.0 ml/min. A sample solution of 25 mg cellulose ester in 10 ml THF with BHT preservative and 10 µl toluene flow rate marker is made. The injection volume is 50 µl. The column set is Polymer Laboratories 5 µm PLgel, Guard+Mixed C+Oligopore. The detection is by refractive index. The calibrants are monodisperse polystyrene standards, Mw=580 to 3,220,000 from Polymer Laboratories. The universal calibration parameters are as follows: PS (K=0.0001280 and a=0.7120) and CE (K=0.00007572 and a=0.8424). The universal calibration parameters above were determined by light scattering and viscosometery to yield the correct weight average molecular weights. In a further embodiment, the Mw is from about 15,000 to about 300,000. In yet further embodiments, the Mw ranges from about 10,000 to about 250,000; from about 15000 to 200000; from about 20,000 to about 150,000; from about 50,000 to about 150,000, or from about 70,000 to about 120,000.

In embodiments of the invention, the polymer-based resin comprises a cellulose ester which has an absolute weight average molecular weight in the range of from about 40,000 Da to about 200,000 Da measured according to ASTM D5296 using tetrahydrofuran as a solvent and a flow rate of 1 mL/min. In certain embodiments, the cellulose ester has an absolute weight average molecular weight in the range of from about 50,000 Da to about 200,000 Da, or 50,000 Da to about 170,000 Da, or 50,000 Da to about 120,000 Da, or 50,000 Da to about 90,000 Da, or 60,000 Da to about 200,000 Da, or 60,000 Da to about 170,000 Da, or 60,000 Da to about 120,000 Da, or 60,000 Da to about 90,000 Da, or 90,000 Da to about 170,000 Da, or 90,000 Da to about 120,000 Da, or 120,000 Da to about 170,000 Da, or 120,000 Da to about 200,000 Da, measured according to ASTM D5296 using tetrahydrofuran as a solvent and a flow rate of 1 mL/min.

The most common commercial secondary cellulose esters are prepared by initial acid catalyzed heterogeneous acylation of cellulose to form the cellulose triester. After a homogeneous solution in the corresponding carboxylic acid of the cellulose triester is obtained, the cellulose triester is then subjected to hydrolysis until the desired degree of substitution is obtained. After isolation, a random secondary cellulose ester is obtained. That is, the relative degree of substitution (RDS) at each hydroxyl is roughly equal.

Some examples of cellulose esters that may be useful in the present invention can be prepared using techniques known in the art and can be obtained from Eastman Chemical Company, Kingsport, TN, U.S.A., e.g., Eastman™ Cellulose Acetate Propionate CAP 482-20, Eastman™ Cellulose Acetate Propionate CAP 141-20, Eastman™ Cellulose Acetate Butyrate CAB 381-20, Cellulose Acetate Butyrate CAB 171-15 and Eastman™ Cellulose Acetate CA 398-30.

In embodiments, the cellulose esters utilized in this invention can also contain chemical functionality and are described herein as either derivatized, modified, or functionalized cellulose esters. Functionalized cellulose esters can be produced by reacting the free hydroxyl groups of cellulose esters with a bifunctional reactant that has one linking group for grafting to the cellulose ester and one functional group to provide a new chemical group to the cellulose ester. Examples of such bifunctional reactants include succinic anhydride which links through an ester bond and provides acid functionality; mercaptosilanes which links through alkoxysilane bonds and provides mercapto functionality; and isocyanotoethyl methacrylate which links through a urethane bond and gives methacrylate functionality.

In one embodiment of the invention, functionalized cellulose esters are produced by reacting the free hydroxyl groups of the cellulose esters with a bifunctional reactant producing a cellulose ester with at least one functional group selected from the group consisting of unsaturation (double bonds), carboxylic acids, acetoacetate, acetoacetate imide, mercapto, melamine, and long alkyl chains.

Bifunctional reactants to produce cellulose esters containing unsaturation (double bonds) functionality are described in U.S. Pat. Nos. 4,839,230, 5,741,901, 5,871,573, 5,981, 738, 4,147,603, 4,758,645, and 4,861,629; all of which are incorporated by reference to the extent they do not contradict the statements herein. In one embodiment, the cellulose esters containing unsaturation is produced by reacting a cellulose ester containing residual hydroxyl groups with an acrylic based compound and m-isopropylenyl-α,α'-dimethylbenzyl isocyanate. The grafted cellulose ester is a urethane-containing product having pendant (meth)acrylate and α-methylstyrene moieties. In another embodiment, the cellulose esters containing unsaturation is produced by reacting maleic anhydride and a cellulose ester in the presence of an alkaline earth metal or ammonium salt of a lower alkyl monocarboxylic acid catalyst, and at least one saturated monocarboxylic acid have 2 to 4 carbon atoms. In another embodiment, the cellulose esters containing unsaturation is produced from the reaction product of (a) at least one cellulosic polymer having isocyanate reactive hydroxyl functionality, and (b) at least one hydroxyl reactive poly (alpha,beta ethyleneically unsaturated) isocyanate.

Bifunctional reactants to produce cellulose esters containing carboxylic acid functionality are described in U.S. Pat. Nos. 5,384,163, 5,723,151, and 4,758,645; all of which are incorporated by reference to the extent they do not contradict the statements herein. In one embodiment, the cellulose esters containing carboxylic acid functionality is produced by reacting a cellulose ester and a mono- or di-ester of maleic or fumaric acid, thereby obtaining a cellulose derivative having double bond functionality. In another embodiment, the cellulose esters containing carboxylic acid functionality has a first and second residue, wherein the first residue is a residue of a cyclic dicarboxylic acid anhydride and the second residue is a residue of an oleophilic monocarboxylic acid and/or a residue of a hydrophilic monocarboxylic acid. In yet another embodiment, the cellulose esters containing carboxylic acid functionality are cellulose acetate phthalates, which can be prepared by reacting cellulose acetate with phthalic anhydride.

Bifunctional reactants to produce cellulose esters containing acetoacetate functionality are described in U.S. Pat. No. 5,292,877; which is incorporated by reference to the extent it does not contradict the statements herein. In one embodiment, the cellulose esters containing acetoacetate functionality are produced by contacting: (i) cellulose; (ii) diketene, an alkyl acetoacetate, 2,2,6, trimethyl-4H 1,3-dioxin-4-one, or a mixture thereof, and (iii) a solubilizing amount of solvent system comprising lithium chloride plus a carboxamide selected from the group consisting of 1-methyl-2-pyrrolidinone, N,N dimethylacetamide, or a mixture thereof.

Bifunctional reactants to produce cellulose esters containing acetoacetate imide functionality are described in U.S. Pat. No. 6,369,214 which is incorporated by reference to the extent it does not contradict the statements herein. Cellulose esters containing acetoacetate imide functionality are the reaction product of a cellulose ester and at least one acetoacetyl group and an amine functional compound comprising at least one primary amine.

Bifunctional reactants to produce cellulose esters containing mercapto functionality are described in U.S. Pat. No. 5,082,914; which is incorporated by reference to the extent it does not contradict the statements herein. In one embodiment of the invention, the cellulose ester is grafted with a silicon-containing thiol component which is either commercially available or can be prepared by procedures known in the art. Examples of silicon-containing thiol compounds include, but are not limited to, (3-mercaptopropyl) trimethoxysilane, (3-mercaptopropyl)-dimethyl-methoxysilane, (3-mercaptopropyl)dimethoxymethylsilane, (3-mercaptopropyl)dimethylchlorosilane, (3-mercaptopropyl) dimethylethoxysilane, (3-mercaptopropyl)diethyoxymethylsilane, and (3-mercapto-propyl)triethoxysilane.

Bifunctional reactants to produce cellulose esters containing melamine functionality are described in U.S. Pat. No. 5,182,379; which is incorporated by reference to the extent it does not contradict the statements herein. In one embodiment, the cellulose esters containing melamine functionality are prepared by reacting a cellulose ester with a melamine compound to form a grafted cellulose ester having melamine moieties grafted to the backbone of the anhydrogluclose rings of the cellulose ester. In one embodiment, the melamine compound is selected from the group consisting of methylol ethers of melamine and aminoplast resins.

Bifunctional reactants to produce cellulose esters containing long alkyl chain functionality are described in U.S. Pat. No. 5,750,677; which is incorporated by reference to the extent it does not contradict the statements herein. In one embodiment, the cellulose esters containing long alkyl chain functionality is produced by reaction of cellulose in a carboxamide diluents or a urea-based diluent with an acylating reagent using a titanium-containing specifies. Cellulose esters containing long alkyl chain functionality can be selected from the group consisting of cellulose acetate hexanoate, cellulose acetate nonanoate, cellulose acetate laurate, cellulose palmitate, cellulose acetate stearate, cellulose nonanoate, cellulose hexanoate, cellulose hexanoate propionate, and cellulose nonanoate propionate.

In embodiments of the invention, the impact modifier can be any material found to increase the impact strength of cellulose ester compositions. In one embodiment, the impact modifier can be any polymeric material classified as an elastomer with a glass transition temperature (Tg) below room temperature. Tg can be measured for example according to ASTM D3418 using a TA 2100 Thermal Analyst Instrument using a scan rate of 20° C./min. Several classes of impact modifier fit this description.

In one embodiment, the impact modifier can be selected from the class of materials known as modified polyolefins. In this class, the olefin is copolymerized with additional monomers that limit the crystallization of the polymer, increase the amount of the chain with Tg below room temperature, and reduce the modulus below 500 MPa. Examples of modified olefins include EMA (examples include Elvaloy 4051, Lotader 3410 and Lotader 8900), EBA, EVA (examples include Levamelt 500, Levamelt 600, Levamelt 700, Levamelt 800, Elvax 40W, Evatane 28-40, Evatane 40-55, Evatane 18-150, Bynel E418 and Bynel 3101), EEA, EPDM (examples include Royaltuf 498), and EPR.

In one class of the embodiment, the impact modifier is a block copolymer in which at least one segment of the chain has a Tg below room temperature, referred to as the soft segment, and at least one segment of the chain has a Tg or Tm above room temperature, referred to as the hard segment. These block copolymers are also commonly referred to as thermoplastic elastomers (TPEs). Examples of block copolymers of this class include styrenic materials such as SBS, SEBS, and SIS (examples include Kraton G1657MS, Kraton FG1901 G and Kraton FG1924 G); thermoplastic urethanes (TPU) (examples include Elastolan 1170Z, Estane 2355, Estane ALR CL87A and Estane ALR 72A); polyester-ether copolymers (examples include Ecdel 9966 and Hytrel 3078) or polyamide-ether copolymers (examples include Pebax 5533).

In one embodiment, the impact modifier can be selected from the class of emulsion-prepared materials known as core-shell impact modifiers. In one embodiment, the impact modifier is a MBS core-shell impact modifier such as a methacrylate-butadiene-styrene that has a core made out of butadiene-styrene copolymers and shell made out of methyl methacrylate-styrene copolymer. In another embodiment, the impact modifier is an acrylic core-shell impact modifier that has a core made from an acrylic polymer, such as butyl acrylate or styrene butyl acrylate, and shell from made from polymethylmethacrylate or styrene methylmethacryalate copolymer.

In one embodiment of the invention, the core shell impact modifier is an MBS impact modifier that can comprise:

(A) from about 70 to about 85 parts of a core comprising from about 15 to about 35 percent by weight of units derived from at least one vinyl aromatic monomer, and from about 65 to about 85 percent by weight of units derived from at least one diolefin monomer;

(B) from about 8 to about 14 parts of an inner graft stage comprising at least one vinyl aromatic monomer or at least one C1-C4 alkyl methacrylate monomer;

(C) from about 0.1 to about 5 parts of an intermediate sealer stage comprising at least one monomer selected from a C1-C8 alkyl acrylate or a polyunsaturated crosslinker; and (D) from about 10 to about 16 parts of an outer shell comprising at least one C1-C4 alkyl (meth)acrylate monomers or at least one vinyl aromatic monomer.

In embodiments, the MBS impact modifier can comprise graft polymer compositions comprising 10 to 70 percent by weight of a polymer or a copolymer of butadiene and grafts of firstly methyl(meth)acrylate and cross-linker, and secondly of styrene, and thirdly of methyl(meth)acrylate with an optional cross-linker.

Monomers suitable for polymerization with the conjugated diolefin and preferably with butadiene, can include alkenyl aromatic compounds and preferably vinyl aromatic compounds such as styrene, divinylbenzene, alpha-methyl styrene, vinyl toluene, hydrogenated styrene; lower (CZ-Cu) alkyl acrylates such as ethyl acrylate, n-propylacrylate, n-butyl acrylate, Z-methylbutylacrylate, 3-methylbutyl acrylate, amylacrylate, n-hexylacrylate, Z-ethylhexyl acrylate; lower (C2-C12) alkyl(meth)acrylates; acrylonitriles; olefins; and the like; or a combination of any of the foregoing.

Suitable cross-linking agents include divinylbenzene; di(meth)acrylates; diacrylates such as the diacrylate of mono-, di- or polyethylene glycol; their (meth)acrylates; divinyl sulfide; divinyl ether; vinyl acrylate; vinyl(meth)acrylate; trivinylbenzene; trimethylolpropane; tri(meth)acrylate; triallyl cyanurate and triallyl isocyanurate.

In one embodiment, the MBS core-shell impact modifier can comprise a copolymer of butadiene and styrene and most preferably a terpolymer of butadiene, styrene, and divinylbenzene. Although the relative amounts of the monomers which comprise the copolymeric substrate may vary, the butadiene component will typically comprise from about 30 to 100 parts by weight, the styrene component will comprise from 0 to about 70 parts by weight, and the divinylbenzene component will comprise from 0 to about 5 parts by weight based upon 100 parts by weight of butadiene, styrene, and divinylbenzene combined. In an embodiment, the copolymer substrate can comprise from about 50 to about 90 parts by weight of butadiene, from about 10 to about 50 parts by weight of styrene, and from 0 to about 5 parts by weight of divinylbenzene on the same basis, and most preferably, from about 65 to about 85 parts by weight of butadiene, from about 15 to about 35 parts by weight of styrene, and from about 0.5 to about 2.0 parts by weight of divinylbenzene on the same basis.

Examples of methacrylate-butadiene-styrene core shell polymers are those described in, but not limited to, U.S. Pat. Nos. 4,446,585, 5,534,594, and 6,331,580. MBS core-shell impact modifiers can be obtained as Kane Ace B564 from Kaneka, Clearstrength from Arkema, Metablen C and Metablen E from Mitsubishi Chemical, Paraloid from Dow, and Visiomer from Evonik.

In one embodiment of the present invention, the core shell impact modifier is an acrylic impact modifier comprising about 25 to 95 weight percent of a first elastomeric phase polymerized from a monomer system comprising about 75 to 99.8 percent by weight of a (C1 to C6) alkyl acrylate, 0.1 to 5 percent by weight cross-linking monomer, and 0.1 to 5 percent by weight graft linking monomer, and about 75 to 5 weight percent of a final, rigid thermoplastic phase free of epoxy groups polymerized in the presence of said elastomeric phase.

Examples of useful acrylates are methyl acrylate, ethyl acrylate, butyl acrylate, 2-ethylhexyl acrylate and the like. In some embodiments, the acrylates are n~butyl acrylate and ethyl acrylate.

Graft linking monomer is defined as polyethylenically unsaturated monomer which has both a highly reactive double bond and a double bond of lower reactivity such that the highly reactive double bond tends to polymerize during the first stage monomer polymerization leaving a remaining double bond for polymerization during the next stage polymerization and thereby to graft link the first stage with the second stage polymers. In some embodiments, the graft linking monomers are allyl methacrylate, allyl acrylate and diallyl maleate. In an embodiment, 0.05 to 3 percent graft linking monomer is present based on first stage monomer systems. Cross linking monomer is also preferably present, generally in amounts of about 0.05 to 3 percent by weight based on first stage monomer system, and is defined as a polyethylenically unsaturated monomer having at least two double bonds of about equal reactivity so as to cause cross-linking in the first stage polymerization. Examples of typical cross-linking monomers are 1,3-butylene diacrylate, 1,3-butylene dimethacrylate, divinylbenzene and the like.

By "epoxy functionality" is meant the epoxy units which are pendant from the final stage polymer. In some embodiments, epoxy functionality is incorporated into the final stage polymer by use of epoxy containing monomer such as glycidyl acrylate or glycidyl methacrylate in the final stage monomer mixture.

Examples of acrylic core shell polymers are those described in, but not limited to, U.S. Pat. Nos. 3,448,173, 3,655,825, and 3,853,968. Examples of suitable acrylic impact modifiers are Kane Ace ECO100 from Kaneka, Durastrength from Arkema, Elvaloy and Elvaloy HP from DuPont, Metablen W from Mitsubishi Chemical, and Paraloid from Dow.

In one class of this embodiment, the impact modifier is an ABS core-shell impact modifier that has a core made out of butadiene-styrene copolymers and shell made out of acrylonitrile-styrene copolymer. Examples of ABS core-shell impact modifiers include Blendex from Galata Chemicals and Elix from Elix Polymers.

In one class of this embodiment, the impact modifier is a silicone-acrylic core-shell impact modifier that has a core made out of silicone-acrylic rubber and shell made out of PMMA copolymer or methyl methacrylate-styrene copolymer. Examples of silicone-acrylic core-shell impact modifiers include an Metablen S from Mitsubishi Chemical Company.

In one embodiment, the impact modifier has a relatively neutral pH (e.g., pH between 6 and 8, preferably between 6.5 and 7.5). It is believed that this will help prevent the cellulose esters from degrading during the melt processing of the compositions.

In one particularly useful embodiment, the cellulose ester and impact modifier composition is transparent, with light transmission of at least 70%, or at least 75%, or at least 80%, or at least 85%, or at least 90%, measured according to ASTM D1003 using a 3.2 mm plaque after injection molding at a barrel set point of 249° C. and a residence time of 5 min. In certain embodiments, the polymer-based resin has transmission in the range from 70% to 95%, or 75% to 95%, or 80% to 95%, or 85% to 95%, or 70% to 90%, or 75% to 90%, or 80% to 90%, or 85% to 90%, measured according to ASTM D1003 using a 3.2 mm plaque after injection molding at a barrel set point of 249° C. and a residence time of 5 min. In one class of this embodiment, the cellulose ester composition comprising the impact modifier has a percent haze of less than 10%. In embodiments, the cellulose ester composition comprising the impact modifier has a percent haze of less than 8%, or less than 6%, or less than 5%.

In another embodiment, the refractive index (RI) of the impact modifiers is sufficiently close to that of the cellulose esters to provide a composition with high transmission and low haze. In one embodiment, the acrylic impact modifiers have a RI that close to the RI of the cellulose ester of about 1.46-1.50 to provide clear compositions. In embodiments, the impact modifier and cellulose ester components have a difference in refractive index, RI(second component)-RI (first component) (e.g., RI of CE-RI of impact modifier), of about 0.006 to about −0.0006, and the immiscible blend has a percent transmittance of at least 75%, and a haze of 10% or less more preferably 5% or less.

In one embodiment, the impact modifier can be either a non-reactive impact modifier or a reactive impact modifier, or combination of both. The impact modifiers used can also improve mechanical and physical properties of the cellulose ester compositions.

In one embodiment, where non-reactive impact modifiers are utilized, the impact modifier contains a first polymeric chain segment that is more chemically or physically compatible with the cellulose ester than another polymeric chain segment. In an embodiment, the first segment contains polar functional groups, which provide compatibility with the cellulose ester, including, but not limited to, such polar functional groups as ethers, esters, amides, alcohols, amines, ketones and acetals. Compatibility is defined by the preferential interaction of the first polymer chain segment with the cellulose ester polymer relative to the second segment and can mean molecular scale or microscale interactions. The first segment may consist of oligomers or polymers of the following: cellulose esters; cellulose ethers; polyoxyalkylene, such as, polyoxyethylene, polyoxypropylene, polyoxybutylene; polyglycols, such as, polyethylene glycol, polypropylene glycol, polybutylene glycol; polyesters, such as, polycaprolactone, polylactic acid, aliphatic polyesters, aliphatic-aromatic copolyesters; polyacrylates and polymethacrylates; polyacetals; polyvinylpyrrolidone; polyethylenevinyl acetate; polyvinyl acetate; and polyvinyl alcohol. In one embodiment, the first segment is polyethylenevinyl acetate; polyoxyethylene or polyvinyl alcohol.

In embodiments, the second segment can be either saturated or unsaturated hydrocarbon groups or contain both saturated and unsaturated hydrocarbon groups. The second segment can be an oligomer or a polymer. In one embodiment of the invention, the second segment of the non-reactive impact modifier is selected from the group consisting of polyolefins, polydienes, polyaromatics, and copolymers. An example of a polyaromatic second segment is polystyrene. An example of a copolymer second segment is styrene/butadiene copolymer.

The first and second segments of the non-reactive impact modifiers can be in a diblock, triblock, branched or comb structure. The molecular weight of the non-reactive impact modifiers can range from about 300 to about 20,000 or from about 500 to about 10,000 or from about 1,000 to about 5,000. The segment ratio of the non-reactive impact modifiers can range from about 15 to about 85% polar first segments to about 15 to about 85% nonpolar second segments.

Examples of non-reactive impact modifiers include, but are not limited to, ethoxylated alcohols, ethoxylated alkylphenols, ethoxylated fatty acids, polyethylenevinyl acetate, block polymers of propylene oxide and ethylene oxide, ethylene/propylene terpolymers, functionalized polyolefins, polyglycerol esters, polysaccharide esters, and sorbitan esters. Examples of ethoxylated alcohols are $C_{11}$-$C_{15}$ secondary alcohol ethoxylates, polyoxyethylene cetyl ether, polyoxyethylene stearyl ether, and $C_{12}$-$C_{14}$ natural liner alcohol ethoxylated with ethylene oxide. $C_{11}$-$C_{15}$ secondary ethyoxylates can be obtained as Dow Tergitol® 15S from the Dow Chemical Company. Polyoxyethlene cetyl ether and polyoxyethylene stearyl ether can be obtained from ICI Surfactants under the Brij® series of products. $C_{12}$-$C_{14}$ natural linear alcohol ethoxylated with ethylene oxide can be obtained from Hoechst Celanese under the Genapol® series of products. Examples of ethoxylated alkylphenols include octylphenoxy poly(ethyleneoxy)ethanol and nonylphenoxy poly(ethyleneoxy)ethanol. Octylphenoxy poly(ethyleneoxy)ethanol can be obtained as Igepal® CA series of products from Rhodia, and nonylphenoxy poly(ethyleneoxy)ethanol can be obtained as Igepal CO series of products from Rhodia or as Tergitol® NP from Dow Chemical Company. Ethyoxylated fatty acids can include polyethyleneglycol monostearate or monolaruate which can be obtained from Henkel under the Nopalcol® series of products. Block polymers of propylene oxide and ethylene oxide can be obtained under the Pluronic® series of products from BASF. Polyglycerol esters can be obtained from Stepan under the Drewpol® series of products. Polysaccharide esters can be obtained from Henkel under the Glucopon® series of products, which are alkyl polyglucosides. Sorbitan esters can be obtained from ICI under the Tween® series of products.

In another embodiment of the invention, the non-reactive impact modifiers can be synthesized in situ in the cellulose ester composition by reacting cellulose ester-compatible compounds. These compounds can be, for example, telechelic oligomers, which are defined as prepolymers capable of entering into further polymerization or other reaction through their reactive end groups. In one embodiment of the invention, these in situ impact modifiers can have higher molecular weight from about 10,000 to about 1,000,000.

In another embodiment of the invention, the impact modifier can be reactive. The reactive impact modifier can comprise a polymer or oligomer compatible with one component of the composition and functionality capable of reacting with another component of the composition. In embodiments, there are two types of reactive impact modifiers that can be used. The first reactive impact modifier has a hydrocarbon chain that is compatible with the cellulose ester and also has functionality capable of reacting with the cellulose ester. Such functional groups include, but are not limited to, carboxylic acids, anhydrides, acid chlorides, epoxides, and isocyanates. Specific examples of this type of reactive impact modifier include, but are not limited to: long chain fatty acids, such as, stearic acid (octadecanoic acid); long chain fatty acid chlorides, such as, stearoyl chloride (octadecanoyl chloride); long chain fatty acid anhydrides, such as, stearic anhydride (octadecanoic anhydride); epoxidized oils and fatty esters; styrene maleic anhydride copolymers; maleic anhydride grafted polypropylene; copolymers of maleic anhydride with olefins and/or acrylic esters, e.g. terpolymers of ethylene, acrylic ester and maleic anhydride; and copolymers of glycidyl methacrylate with olefins and/or acrylic esters, e.g. terpolymers of ethylene, acrylic ester, and glycidyl methacrylate.

Reactive impact modifiers can be obtained as SMA® 3000 styrene maleic anhydride copolymer from Sartomer/Cray Valley, Eastman G-3015® maleic anhydride grafted polypropylene from Eastman Chemical Company, Epolene® E-43 maleic anhydride grafted polypropylene obtained from Westlake Chemical, Lotader® MAH 8200 random terpolymer of ethylene, acrylic ester, and maleic anhydride obtained from Arkema, Lotader® GMA AX 8900 random terpolymer of ethylene, acrylic ester, and glycidyl methacrylate, and Lotarder® GMA AX 8840 random terpolymer of ethylene, acrylic ester, and glycidyl methacrylate.

Modified polyolefin impact modifiers can be obtained as Lotader, Fusabond, Elvloy PTW, Lotryl, Elvaloy AC, Inter-Loy).

The second type of reactive impact modifier has a polar chain that is compatible with the cellulose ester and also has functionality capable of reacting with the cellulose ester. Examples of these types of reactive impact modifiers include cellulose esters or polyethylene glycols with olefin or thiol functionality. Reactive polyethylene glycol impact modifiers with olefin functionality include, but are not limited to, polyethylene glycol allyl ether and polyethylene glycol acrylate. An example of a reactive polyethylene glycol impact modifier with thiol functionality includes polyethylene glycol thiol. An example of a reactive cellulose ester impact modifier includes mercaptoacetate cellulose ester.

In embodiments of the invention, the amount of impact modifier in the cellulose ester composition can range from about 1 wt % to about 30 wt %, or from about 1 wt % to about 15 wt %, or from about 5 wt % to about 10 wt %, or from about 10 wt % to about 30 wt %, or from about 15 wt % to about 30 wt %, based on the weight of the cellulose ester composition.

In another embodiment of the invention, the cellulose ester compositions further comprise at least one additional polymeric component as a blend (with the cellulose ester) in an amount from 5 to 95 weight %, based on the total cellulose ester composition. Suitable examples of the additional polymeric component include, but are not limited to, nylon; polyesters; polyamides; polystyrene; other cellulose esters, cellulose ethers; polystyrene copolymers; styrene acrylonitrile copolymers; polyolephins; polyurethanes; acrylonitrile butadiene styrene copolymers; poly(methylmethacrylate); acrylic copolymers; poly(ether-imides); polyphenylene oxides; polyvinylchloride; polyphenylene sulfides; polyphenylene sulfide/sulfones; poly(ester-carbonates); polycarbonates; polysulfones; poly lactic acid; poly butylenesuccinate; polysulfone ethers; and poly(ether-ketones) of aromatic dihydroxy compounds; or mixtures of any of the foregoing polymers. The blends can be prepared by conventional processing techniques known in the art, such as melt blending or solution blending.

In one embodiment of the invention, the composition can contain a plasticizer. The plasticizer utilized in this invention can be any that is known in the art that can reduce the glass transition temperature and/or the melt viscosity of the cellulose ester to improve melt processing characteristics. The plasticizer may be any plasticizer suitable for use with a cellulose ester. The plasticizer level should be lower than the normal (or typical) plasticizer level for cellulose esters; so that the compositions have higher Tg (or HDT) than fully plasticized cellulose ester compositions, good toughness and good flow. In embodiments, the plasticizer is present in an amount that does not substantially reduce the Tg (or HDT) of the cellulose ester composition compared to a similar composition without the plasticizer. In embodiments, the Tg (or HDT) does not change (e.g., reduce) more than 20%, or 15%, or 10%, or 5%, or 2%, as a result of including the plasticizer.

The plasticizer can be either monomeric or polymeric in structure. In one embodiment, the plasticizer is at least one selected from the group consisting of an aromatic phosphate ester plasticizer, alkyl phosphate ester plasticizer, dialkylether diester plasticizer, tricarboxylic ester plasticizer, polymeric polyester plasticizer, polyglycol diester plasticizer, polyester resin plasticizer, aromatic diester plasticizer, aromatic trimester plasticizer, aliphatic diester plasticizer, carbonate plasticizer, epoxidized ester plasticizer, epoxidized oil plasticizer, benzoate plasticizer, polyol benzoate plasticizer adipate plasticizer, a phthalate plasticizer, a glycolic acid ester plasticizer, a citric acid ester plasticizer, a hydroxyl-functional plasticizer, or a solid, non-crystalline resin plasticizer.

In one embodiment of the invention, the plasticizer can be selected from at least one of the following: triphenyl phosphate, tricresyl phosphate, cresyldiphenyl phosphate, octyldiphenyl phosphate, diphenylbiphenyl phosphate, trioctyl phosphate, tributyl phosphate, diethyl phthalate, dimethoxyethyl phthalate, dimethyl phthalate, dioctyl phthalate, dibutyl phthalate, di-2-ethylhexyl phthalate, butylbenzyl phthalate, dibenzyl phthalate, butyl phthalyl butyl glycolate, ethyl phthalyl ethyl glycolate, methyl phthalyl ethyl glycolate, triethyl citrate, tri-n-butyl citrate, acetyltriethyl citrate, acetyl-tri-n-butyl citrate, and acetyl-tri-n-(2-ethylhexyl) citrate, diethylene glycol dibenzoate, dipropylene glycol dibenozoate, or triethylene glycol dibenzoate.

In another embodiment of the invention, the plasticizer can be selected from at least one of the following: esters comprising: (i) acid residues comprising one or more residues of: phthalic acid, adipic acid, trimellitic acid, succinic acid, benzoic acid, azelaic acid, terephthalic acid, isophthalic acid, butyric acid, glutaric acid, citric acid or phosphoric acid; and (ii) alcohol residues comprising one or more residues of an aliphatic, cycloaliphatic, or aromatic alcohol containing up to about 20 carbon atoms.

In another embodiment of the invention, the plasticizer can be selected from at least one of the following: esters comprising: (i) at least one acid residue selected from the group consisting of phthalic acid, adipic acid, trimellitic acid, succinic acid, benzoic acid, azelaic acid, terephthalic acid, isophthalic acid, butyric acid, glutaric acid, citric acid and phosphoric acid; and (ii) at least one alcohol residue selected from the group consisting of aliphatic, cycloaliphatic, and aromatic alcohol containing up to about 20 carbon atoms.

In another embodiment of the invention, the plasticizer can comprise alcohol residues where the alcohol residues is at least one selected from the following: stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol.

In another embodiment of the invention, the plasticizer can be selected from at least one of the following: benzoates, phthalates, phosphates, arylene-bis(diaryl phosphate), and isophthalates. In another embodiment, the plasticizer comprises diethylene glycol dibenzoate, abbreviated herein as "DEGDB".

In another embodiment of the invention, the plasticizer can be selected from at least one of the following: aliphatic polyesters comprising $C_{2-10}$ diacid residues, for example, malonic acid, succinic acid, glutaric acid, adipic acid, pimelic acid, suberic acid, azelaic acid, and sebacic acid; and $C_{2-10}$ diol residues.

In another embodiment, the plasticizer can comprise diol residues which can be residues of at least one of the following $C_2$-$C_{10}$ diols: ethylene glycol, diethylene glycol, 1,2-propylene glycol, 1,3-propylene glycol, 1,2-butylene glycol, 1,3-butylene glycol, 1,4-butylene glycol, neopentyl glycol, 1,5-pentanediol, 1,6 hexanediol, 1,5-pentylene glycol, triethylene glycol, and tetraethylene glycol.

In another embodiment of the invention, the plasticizer can include polyglycols, such as, for example, polyethylene glycol, polypropylene glycol, and polybutylene glycol. These can range from low molecular weight dimers and trimers to high molecular weight oligomers and polymers. In one embodiment, the molecular weight of the polyglycol can range from about 200 to about 2000.

In another embodiment of the invention, the plasticizer comprises at least one of the following: Resoflex® R296 plasticizer, Resoflex® 804 plastocizer, SHP (sorbitol hexapropionate), XPP (xylitol pentapropionate), XPA (xylitol pentaacetate), GPP (glucose pentaacetate), GPA (glucose pentapropionate) and APP (arabitol pentapropionate).

In another embodiment of the invention, the plasticizer comprises one or more of: A) from about 5 to about 95 weight % of a $C_2$-$C_{12}$ carbohydrate organic ester, wherein the carbohydrate comprises from about 1 to about 3 monosaccharide units; and B) from about 5 to about 95 weight % of a $C_2$-$C_{12}$ polyol ester, wherein the polyol is derived from a $C_5$ or $C_6$ carbohydrate. In one embodiment, the polyol ester does not comprise or contain a polyol acetate or polyol acetates.

In another embodiment, the plasticizer comprises at least one carbohydrate ester and the carbohydrate portion of the carbohydrate ester is derived from one or more compounds selected from the group consisting of glucose, galactose, mannose, xylose, arabinose, lactose, fructose, sorbose, sucrose, cellobiose, cellotriose and raffinose.

In another embodiment of the invention, the plasticizer comprises at least one carbohydrate ester and the carbohydrate portion of the carbohydrate ester comprises one or more of α-glucose pentaacetate, β-glucose pentaacetate, α-glucose pentapropionate, β-glucose pentapropionate, α-glucose pentabutyrate and β-glucose pentabutyrate.

In another embodiment, the plasticizer comprises at least one carbohydrate ester and the carbohydrate portion of the carbohydrate ester comprises an α-anomer, a β-anomer or a mixture thereof.

In another embodiment, the plasticizer can be selected from at least one of the following: propylene glycol dibenzoate, glyceryl tribenzoate, diethylene glycol dibenzoate, triethylene glycol dibenzoate, di propylene glycol dibenzoate, and polyethylene glycol dibenzoate.

In another embodiment of the invention, the plasticizer can be a solid, non-crystalline resin. These resins can contain some amount of aromatic or polar functionality and can lower the melt viscosity of the cellulose esters. In one embodiment of the invention, the plasticizer can be a solid, non-crystalline compound (resin), such as, for example, rosin; hydrogenated rosin; stabilized rosin, and their monofunctional alcohol esters or polyol esters; a modified rosin including, but not limited to, maleic- and phenol-modified rosins and their esters; terpene resins; phenol-modified terpene resins; coumarin-indene resins; phenolic resins; alkylphenol-acetylene resins; and phenol-formaldehyde resins.

In another embodiment of the invention, the plasticizer is at least one plasticizer selected from the group consisting of: triacetin, trimethyl phosphate, triethyl phosphate, tributyl phosphate, triphenyl phosphate, triethyl citrate, acetyl trimethyl citrate, acetyl triethyl citrate, acetyl tributyl citrate, tributyl-o-acetyl citrate, dibutyl phthalate, diaryl phthalate, diethyl phthalate, dimethyl phthalate, di-2-methoxyethyl phthalate, di-octyl phthalate, di-octyl adipate, dibutyl tartrate, ethyl o-benzoylbenzoate, ethyl phthalyl ethyl glycolate, methyl phthalyl ethyl glycolate, n-ethyltoluenesulfonamide, o-cresyl p-toluenesulfonate, aromatic diol, substituted aromatic diols, aromatic ethers, tripropionin, tribenzoin, polycaprolactone, glycerin, glycerin esters, diacetin, glycerol acetate benzoate, polyethylene glycol, polyethylene glycol esters, polyethylene glycol diesters, di-2-ethylhexyl polyethylene glycol ester, triethylene glycol bis-2-ethyl hexanoate, glycerol esters, diethylene glycol, polypropylene glycol, polyglycoldiglycidyl ethers, dimethyl sulfoxide, N-methyl pyrollidinone, C1-C20 dicarboxylic acid esters, dimethyl adipate, di-butyl maleate, di-octyl maleate, resorcinol monoacetate, catechol, catechol esters, phenols, epoxidized soy bean oil, castor oil, linseed oil, epoxidized linseed oil, other vegetable oils, other seed oils, difunctional glycidyl ether based on polyethylene glycol, γ-valerolactone, alkylphosphate esters, aryl phosphate esters, phospholipids, eugenol, cinnamyl alcohol, camphor, methoxy hydroxy acetophenone, vanillin, ethylvanillin, 2-phenoxyethanol, glycol ethers, glycol esters, glycol ester ethers, polyglycol ethers, polyglycol esters, ethylene glycol ethers, propylene glycol ethers, ethylene glycol esters, propylene glycol esters, polypropylene glycol esters, acetylsalicylic acid, acetaminophen, naproxen, imidazole, triethanol amine, benzoic acid, benzyl benzoate, salicylic acid, 4-hydroxybenzoic acid, propyl-4-hydroxybenzoate, methyl-4-hydroxybenzoate, ethyl-4-hydroxybenzoate, benzyl-4-hydroxybenzoate, diethylene glycol dibenzoate, dipropylene glycol dibenozoate, triethylene glycol dibenzoate, butylated hydroxytoluene, butylated hydroxyanisol, sorbitol, xylitol, ethylene diamine, piperidine, piperazine, hexamethylene diamine, triazine, triazole, pyrrole, and any combination thereof.

The amount of plasticizer in the cellulose ester composition can range from 0 to about 15 weight percent based on the weight of the cellulose ester composition. In one embodiment, the amount can range up to about 15 weight percent based on the weight of the cellulose ester composition. In another embodiment, the amount can range up to about 10 weight percent based on the weight of the cellulose ester composition. In another embodiment, the amount can range up to about 5 weight percent based on the weight of the cellulose ester composition, or up to about 3 weight percent based on the weight of the cellulose ester composition, or less than 2 weight percent based on the weight of the cellulose ester composition.

In another embodiment of the invention, the cellulose ester composition contains no plasticizer. In one embodiment, the cellulose ester composition comprises a cellulose ester that is CAP and no plasticizer. In one embodiment, the cellulose ester composition comprises a cellulose ester that is CAB and no plasticizer.

In another embodiment of the invention, the composition is melt processable. Melt processbility generally refers to the ability to thermally process the materials below their degradation temperature to obtain homogeneous pellets or plastic articles. For example, the compositions described can be melt extruded on a Werner & Pflerderer 30 mm twin screw extruder at a throughput of 35 lbs/hour with screw speed of 250 rpm and barrel temperature of 240° C. injection molded on a Toyo 110 injection molding machine with barrel temperature of 240° C. and mold temperature of 160° F. with minimal molecular weight or color degradation.

In one embodiment of this invention, a melt processable cellulose ester composition is provided comprising 1 to 30 wt %, or 1 to 15 wt %, or 2 to 10 wt % of impact modifiers and no plasticizer, the cellulose ester composition having a heat deflection temperature (HDT) value of greater than 95° C. (measured according to ASTM D648 at a 1.82 MPa stress level after conditioning for 4 hours at 70° C.), and notched Izod impact strength value of greater than 80 J/m (measured according to ASTM D256 on 3.2 mm thick bars at 23° C.), and spiral flow values of at least 15 inches at 240° C. when measured using the procedure described herein. In one embodiment, the cellulose ester composition has a Tg value measured at 20° C./min according to ASTM D3418 of greater than 120° C. Unless specified otherwise, Notched Izod Impact Strength was performed on molded bars after notching according to ASTM Method D256 after conditioning at 23° C. and 50% RH for 48 hours, on 3.2 mm thick bars at 23° C.

In another embodiment of the invention, the compositions have a melt viscosity at 240° C. and 400 rad/s of 10,000 P or below measured by a plate-plate melt rheometer such as a Rheometrics Dynamic Analyzer (RDA II) with 25 mm diameter parallel plates, 1 mm gap and 10% strain measured in accordance with ASTM D4440 using frequency scan of between 1 rad/sec and 400 rad/sec.

In one embodiment, the melt processable cellulose ester compositions comprise 1 to 30 wt %, or 1 to 15 wt % of impact modifiers, 0 to 15 wt % of plasticizers, and have a Tg greater than 90° C. In another embodiment, the melt processable cellulose ester compositions comprise 1 to 30 wt %, or 1 to 15 wt % of impact modifiers, 0 to 10 wt % of plasticizers, and have a Tg greater than 100° C. In yet another embodiment, melt processable cellulose ester compositions comprise 1 to 10 wt % of impact modifiers, 0 to 10 wt % of plasticizers, and have a Tg greater than 100° C. In another embodiment, melt processable cellulose ester compositions comprise 1 to 10 wt % of impact modifiers, 0 to 5 wt % of plasticizers, and have a Tg greater than 115° C.

In another embodiment of the invention, the cellulose ester compositions have a Tg or Heat deflection temperature (HDT at 0.455 psi) similar to that of the base cellulose ester polymer with a drop of only a few degrees Celsius (e.g., less than 5° C., or less than 2° C.) with the incorporation of an impact modifier and no plasticizer. Impact properties of these composition can also exceed 80 J/m (notched Izod impact strength at 23° C.).

In embodiments of the invention, the polymer-based resin has a heat distortion temperature ("HDT") greater than 90° C., or greater than 95° C., according to ASTM D648 as measured at 1.82 MPa using a 3.2 mm thick bar that was subjected to 70° C. for 4 hours. In certain embodiments, the polymer-based resin has a heat distortion temperature ("HDT") of at least 95° C., at least 100° C., at least 105° C., or at least 110° C., or at least 115° C. In certain embodiments, the polymer-based resin has a heat distortion temperature ("HDT") in the range from 90° C. to 140° C., 90° C. to 130° C., 90° C. to 120° C., 90° C. to 110° C., 95° C. to 140° C., 95° C. to 130° C., 95° C. to 120° C., 95° C. to 110° C., 95° C. to 105° C., 100° C. to 140° C., 100° C. to 130° C., 100° C. to 120° C., 100° C. to 110° C., 105° C. to 140° C., 105° C. to 130° C., 105° C. to 120° C., 105° C. to 115° C., 105° C. to 110° C., 110° C. to 140° C., 110° C. to 130° C., 110° C. to 125° C., 110° C. to 120° C., 110° C. to 115° C., 115° C. to 140° C., 115° C. to 130° C., 120° C. to 140° C., 120° C. to 130° C., or 120° C. to 125° C.

In embodiments of the invention, the polymer-based resin has a notched izod impact strength of at least 80 J/m, or at least 90 J/m, or at least 100 J/m, or at least 110 J/m, or at least 120 J/m, or at least 130 J/m, or at least 140 J/m, or at least 150 J/m, or at least 160 J/m, or at least 170 J/m, or at least 180 J/m, or at least 190 J/m, or at least 200 J/m, as measured according to ASTM D256 using a 3.2 mm thick bar that has been subjected to 50% relative humidity for 48 hours at 23° C. In certain embodiments, the polymer-based resin has a notched izod impact strength in the range of from about 80 J/m to about 500 J/m, from about 80 J/m to about 400 J/m, from about 80 J/m to about 300 J/m, from about 80 J/m to about 200 J/m, from about 100 J/m to about 500 J/m, from about 100 J/m to about 400 J/m, from about 100 J/m to about 300 J/m, from about 100 J/m to about 200 J/m, from about 120 J/m to about 500 J/m, from about 120 J/m to about 400 J/m, from about 120 J/m to about 300 J/m, from about 120 J/m to about 200 J/m, from about 150 J/m to about 500 J/m, from about 150 J/m to about 400 J/m, from about 150 J/m to about 300 J/m, from about 150 J/m to about 200 J/m, from about 170 J/m to about 500 J/m, from about 170 J/m to about 400 J/m, from about 170 J/m to about 300 J/m, from about 170 J/m to about 200 J/m, from 180 J/m to about 500 J/m, from about 180 J/m to about 400 J/m, from about 180 J/m to about 300 J/m, from about 180 J/m to about 200 J/m, from 190 J/m to about 500 J/m, from about 190 J/m to about 400 J/m, from about 190 J/m to about 300 J/m, from about 190 J/m to about 200 J/m, from 200 J/m to about 500 J/m, from about 200 J/m to about 400 J/m, or from about 200 J/m to about 300 J/m, as measured according to ASTM D256 using a 3.2 mm thick bar that has been subjected to 50% relative humidity for 48 hours at 23° C.

In embodiments of the invention, the polymer-based resin has a flexural modulus of greater than 1800 MPa as measured according to ASTM D790 using a 3.2 mm thick bar hat has been subjected to 50% relative humidity for 48 hours at 23° C. In certain embodiments, the polymer-based resin has a flexural modulus of at least 1900 MPa, at least 2000 MPa, at least 2100 MPa, at least 2200 MPa, at least 2300 MPa, or at least 2400 MPa, as measured according to ASTM D790 using a 3.2 mm thick bar hat has been subjected to 50% relative humidity for 48 hours at 23° C. In certain embodiments, the polymer-based resin has a flexural modulus is in the range of from about 1800 to about 3500 MPa, from about 1900 to about 3500 MPa, from about 2000 to about 3500 MPa, from about 2100 to about 3500 MPa, from about 2200 to about 3500 MPa, from about 2300 to about 3500 MPa, from about 2400 to about 3500 MPa, or from about 2500 to about 3500 MPa. as measured according to ASTM D790 using a 3.2 mm thick bar hat has been subjected to 50% relative humidity for 48 hours at 23° C. In certain embodiments, the polymer-based resin has a flexural modulus is in the range of from about 1900 to about 2500 MPa, from about 1900 to about 2800 MPa, or from about 1900 to about 3000

MPa, as measured according to ASTM D790 using a 3.2 mm thick bar hat has been subjected to 50% relative humidity for 48 hours at 23° C.

In certain embodiments of the invention, the cellulose ester compositions contain 1 wt %-30 wt %, or 2 wt %-15 wt % impact modifier, based on the total weight of the cellulose ester composition, and have HDT values greater than 95° C., and notched Izod impact strength values greater than 80, or 100, or 120 J/m, and viscosities at 240° C. and 400 rad/sec less than 10,000 P.

In certain embodiments of the invention, the cellulose ester compositions contain 1 wt %-30 wt %, or 2 wt %-15 wt % impact modifier, based on the total weight of the cellulose ester composition, and have HDT values greater than 95° C., and notched Izod impact strength values greater than 80, or 100, or 120 J/m, and a light transmission value greater than 70%, or at least 75%, or at least 80%, or at least 85%, or at least 90%, measured according to ASTM D1003 using a 3.2 mm plaque after injection molding at a barrel set point of 249° C. and a residence time of 5 min.

One problem that may occur when cellulose esters containing no or low levels of plasticizer are melt processed on screw plasticating injection molding machines is that the screw may have difficulty recovering smoothly (poor screw recovery), leading to poor material feed and a "squeaking" sound. It has surprisingly been found that addition of impact modifiers in accordance with embodiments of this invention can eliminate these problems during injection molding.

In certain embodiments of the invention, the cellulose ester compositions contain 1 wt %-30 wt %, or 2 wt %-15 wt % impact modifier, based on the total weight of the cellulose ester composition, and have HDT values greater than 95° C., and notched Izod impact strength values greater than 80, or 100, or 120 J/m, and do not squeak or have screw recovery issues during injection molding at a barrel set point of 249° C.

In certain embodiments of the invention, the cellulose ester compositions contain 1 wt %-30 wt %, or 2 wt %-15 wt % acrylic core-shell impact modifier, based on the total weight of the cellulose ester composition, and have HDT values greater than 95° C., notched Izod impact strength values greater than 150 J/m, and do not squeak or have screw recovery issues during injection molding at a barrel set point of 249° C.

In another embodiment of the invention, the cellulose ester compositions further comprise at least one additive selected from the group comprising antioxidants, thermal stabilizers, mold release agents, antistatic agents, whitening agents, colorants, flow aids, processing aids, plasticizers, anti-fog additives, minerals, UV stabilizers, lubricants, chain extenders, nucleating agents, reinforcing fillers, wood or flour fillers, glass fiber, carbon fiber, flame retardants, dyes, pigments, colorants, additional resins and combinations thereof.

In certain embodiments, in addition to the impact modifier (discussed herein), the cellulose ester composition includes stabilizers selected from the group consisting of secondary antioxidants, acid scavengers, or a combination thereof. In certain embodiments, in addition to the impact modifier (discussed herein), the cellulose ester composition includes a secondary antioxidant in the range from about 0.1 to about 0.8 wt % based on the total weight of the composition. In certain embodiments, in addition to the impact modifier (discussed herein), the cellulose ester composition includes an acid scavenger in the range from about 0.2 to about 2.0 wt % based on the total weight of the composition. In one embodiment, in addition to the impact modifier (discussed herein), the cellulose ester composition includes a secondary antioxidant in the range from about 0.1 to about 0.8 wt % and an acid scavenger in the range from about 0.2 to about 2.0 wt % based on the total weight of the composition. In one embodiment, the secondary antioxidant is 3,9-bis(2,4-di-tert-butylphenoxy)-2,4,8,10-tetraoxa-3,9-diphosphaspiro[5.5]undecane. In one embodiment, the acid scavenger is an epoxidized fatty acid ester. In one embodiment, the cellulose ester composition further includes a salt stabilizer, for example in the range from about 0.1 to about 0.5 wt % based on the total weight of the composition. In one embodiment, other than the cellulose ester, impact modifier and stabilizers (discussed herein), the cellulose ester composition contains a total of less than 5 wt %, or less than 2 wt %, of any other components, based on the total weight of the composition.

In certain embodiments, the cellulose ester composition contains no maleic anhydride modified EVA. In certain embodiments, the cellulose ester composition contains no polyether ester compounds. In certain embodiments, the cellulose ester composition contains no adipic acid compounds. In certain embodiments, the cellulose ester composition comprises 65-99 wt % of one or more cellulose esters, 1-30 wt % of one or more impact modifiers, and less than 5 wt % total of other components, based on the total weight of the cellulose ester composition. In certain embodiments, such other components do not include plasticizers, polyether ester compounds or adipic acid compounds. In certain embodiments, the cellulose ester composition contains dioctyl adipate (DOA) plasticizer and no other adipic acid compounds.

In another embodiment of the invention, a process for producing a cellulose ester composition is provided. The process comprises contacting at least one cellulose ester, at least one impact modifier, and optionally at least one plasticizer. The cellulose ester, plasticizer, and impact modifiers were previously discussed in this disclosure. In one embodiment, the cellulose ester, impact modifiers, and optional plasticizers can be mixed in any order of addition.

In another embodiment of this invention, a process for producing a cellulose ester composition is provided comprising: a) mixing at least one impact modifier, at least one cellulose ester, and optionally at least one plasticizer for a sufficient time and temperature to disperse the impact modifier to produce the cellulose ester composition. A sufficient temperature is defined as the flow temperature of the cellulose ester which is generally about 50° C. above the Tg of the cellulose ester. In another embodiment, the temperature is about 80° C. above the Tg of the cellulose ester. In embodiments, the temperature at mixing is limited at the upper range by the processing temperature of the impact modifier and at the lower range by the highest use temperature of the cellulose ester composition.

The efficiency of mixing two or more viscoelastic materials can depend on the ratio of the viscosities of the viscoelastic materials. In an embodiment, for a given mixing equipment and shear rate range, the viscosity ratio of the dispersed phase (impact modifier) and continuous phase (cellulose ester) should be within specified limits for obtaining adequate particle size.

In embodiments, mixing of the impact modifiers, cellulose esters, and the optional plasticizers and any additives can be accomplished by any method known in the art that is adequate to disperse the impact modifiers, plasticizers and additives into the cellulose esters. Examples of mixing equipment include, but are not limited to, Banbury mixers, Brabender mixers, roll mills, and extruders (single or twin screw). The shear energy during the mixing is dependent on the combination of equipment, blade design, rotation speed (rpm), and mixing time. The shear energy should be sufficient to disperse the impact modifier throughout the cellulose ester.

In embodiments, the cellulose ester, impact modifier, plasticizer and additives can be combined in any order during the process. In one embodiment, the cellulose ester is premixed with the impact modifier and/or the plasticizer. The cellulose ester containing the impact modifier and/or the plasticizer is then mixed with the additives. In another embodiment of the invention, when reactive impact modifiers are utilized, the reactive impact modifiers can be mixed with the cellulose esters first, and then the other components are added.

The compositions of this invention are useful as molded plastic parts or as solid plastic objects. The compositions are suitable for use in any applications where hard clear plastics are required. Examples of such parts include disposable knives, forks, spoons, plates, cups, straws as well as eyeglass frames, toothbrush handles, toys, automotive trim, tool handles, camera parts, parts of electronic devices, razor parts, ink pen barrels, disposable syringes, bottles, and the like. In one embodiment, the compositions of the present invention are useful as plastics, films, fibers, and sheets. In one embodiment the compositions are useful as plastics to make bottles, bottle caps, eyeglass frames, cutlery, disposable cutlery, cutlery handles, shelving, shelving dividers, electronics housing, electronic equipment cases, computer monitors, printers, keyboards, pipes, automotive parts, automotive interior parts, automotive trim, signs, thermoformed letters, siding, toys, thermally conductive plastics, ophthalmic lenses, tools, tool handles, utensils. In another embodiment, the compositions of the present invention are suitable for use as films, sheeting, fibers, molded articles, medical devices, packaging, bottles, bottle caps, eyeglass frames, cutlery, disposable cutlery, cutlery handles, shelving, shelving dividers, furniture components, electronics housing, electronic equipment cases, computer monitors, printers, keyboards, pipes, toothbrush handles, automotive parts, automotive interior parts, automotive trim, signs, outdoor signs, skylights, multiwall film, thermoformed letters, siding, toys, toy parts, thermally conductive plastics, ophthalmic lenses and frames, tools, tool handles, and utensils, healthcare supplies, commercial foodservice products, boxes, film for graphic arts applications, and plastic film for plastic glass laminates.

The present cellulose ester compositions are useful in forming fibers, films, molded articles, and sheeting. The methods of forming the cellulose ester compositions into fibers, films, molded articles, and sheeting can be according to methods known in the art. Examples of potential molded articles include without limitation: medical devices, medical packaging, healthcare supplies, commercial foodservice products such as food pans, tumblers and storage boxes, bottles, food processors, blender and mixer bowls, utensils, water bottles, crisper trays, washing machine fronts, vacuum cleaner parts and toys. Other potential molded articles could include ophthalmic lenses and frames.

The invention further relates to articles of manufacture comprising the film(s) and/or sheet(s) containing cellulose ester compositions described herein. In embodiments, the films and/or sheets of the present invention can be of any thickness which would be apparent to one of ordinary skill in the art.

The invention further relates to the film(s) and/or sheet(s) described herein. The methods of forming the cellulose ester compositions into film(s) and/or sheet(s) can include known methods in the art. Examples of film(s) and/or sheet(s) of the invention including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, wet block processing, dry block processing and solution casting.

The invention further relates to the molded articles described herein. The methods of forming the cellulose ester compositions into molded articles can include known methods in the art. Examples of molded articles of the invention including but not limited to injection molded articles, extrusion molded articles, injection blow molded articles, injection stretch blow molded articles and extrusion blow molded articles. Methods of making molded articles include but are not limited to injection molding, extrusion, injection blow molding, injection stretch blow molding, and extrusion blow molding. The processes of the invention can include any blow molding processes known in the art including, but not limited to, extrusion blow molding, extrusion stretch blow molding, injection blow molding, and injection stretch blow molding.

This invention includes any injection blow molding manufacturing process known in the art. Although not limited thereto, a typical description of injection blow molding (IBM) manufacturing process involves: 1) melting the composition in a reciprocating screw extruder; 2) injecting the molten composition into an injection mold to form a partially cooled tube closed at one end (i.e. a preform); 3) moving the preform into a blow mold having the desired finished shape around the preform and closing the blow mold around the preform; 4) blowing air into the preform, causing the preform to stretch and expand to fill the mold; 5) cooling the molded article; 6) ejecting the article from the mold.

This invention includes any injection stretch blow molding manufacturing process known in the art. Although not limited thereto, a typical description of injection stretch blow molding (ISBM) manufacturing process involves: 1) melting the composition in a reciprocating screw extruder; 2) injecting the molten composition into an injection mold to form a partially cooled tube closed at one end (i.e. a preform); 3) moving the preform into a blow mold having the desired finished shape around the preform and closing the blow mold around the preform; 4) stretching the preform using an interior stretch rod, and blowing air into the preform causing the preform to stretch and expand to fill the mold; 5) cooling the molded article; 6) ejecting the article from the mold.

This invention includes any extrusion blow molding manufacturing process known in the art. Although not limited thereto, a typical description of extrusion blow molding manufacturing process involves: 1) melting the composition in an extruder; 2) extruding the molten composition through a die to form a tube of molten polymer (i.e. a parison); 3) clamping a mold having the desired finished shape around the parison; 4) blowing aft into the parison, causing the extrudate to stretch and expand to fill the mold; 5) cooling the molded article; 6) ejecting the article of the mold; and 7) removing excess plastic (commonly referred to as flash) from the article.

This invention can be further illustrated by the following examples of preferred embodiments thereof, although it will be understood that these examples are included merely for purposes of illustration and are not intended to limit the scope of the invention unless otherwise specifically indicated.

EXAMPLES

Examples 1-25 in Tables 1-5 were prepared as follows. The cellulosic powder was first premixed in a drum tumbler with either KaneAce B564 MBS impact modifier from Kaneka Corporation or KaneAce ECO100 acrylic impact modifier from Kaneka Corporation along with 1% epoxidized octyl tallate stabilizer.

The premixed material was then compounded on a Werner & Pflerderer 30 mm twin screw extruder at a throughput of 35 lbs/hour with screw speed of 250 rpm and barrel temperature of 220° C. for the CAP 482 based compositions and a barrel temperature of 240° C. for the CA and CAP 141-20 based compositions.

The compounded material was then injection molded into 3.2 mm thick by 12.8 mm wide bars on a Toyo 110 Ton injection molding machine with barrel temperature of 240° C. and mold temperature of 70° C.

The cellulose ester material used in the examples was selected from Eastman products CAP 482-20, CAP482-0.5, and CAP 141-20. Heat Deflection Temperature (HDT) was determined on the molded bars according to ASTM Method D648. Samples were conditioned by placing in a 70° C. oven for 5 hours prior to HDT testing. Notched Izod Impact Strength was performed on the molded bars after notching according to ASTM Method D256 after conditioning at 23° C. and 50% RH for 48 hours.

The compositions and properties of the materials for Examples 1-25, as well as comparative Examples 1 and 2, are shown in Tables 1-5. A review of Tables 1-5, show that examples 1-25 all have higher toughness than comparative examples 1 and 2, that do not contain impact modifier.

TABLE 3

High flow impact modified CAP materials

| Experiment/Composition | ASTM Method | Ex 18 | Ex 19 | Ex 20 | Ex 21 | Ex 22 |
|---|---|---|---|---|---|---|
| CAP 482-20 (wt %) | | 47.5 | 46.5 | 45 | 43.5 | 42 |
| CAP 482-0.5 (wt %) | | 47.5 | 46.5 | 45 | 43.5 | 42 |
| Kane Ace 564 (wt %) | | 4 | 6 | 9 | 12 | 15 |
| Epoxidized octyl tallate (wt %) | | 1 | 1 | 1 | 1 | 1 |
| Heat distortion temperature @0.455 Mpa (° C.) | D648 | 103.8 | 100.9 | 97.9 | 114.5 | 113 |
| Heat distortion temperature @1.82 Mpa (° C.) | | | | | | 96.2 |
| Izod Impact Strength @23° C. (J/m) | D256 | 163.8 | 161 | 145.4 | 141.6 | 179.7 |
| Izod Impact Strength @-40° C. (J/m) | | 97 | 100.8 | 122.5 | 122.6 | 85.5 |

TABLE 4

High temperature impact modified CAP material

| Experiment/Composition | ASTM Method | Comp Ex 2 | Ex 24 |
|---|---|---|---|
| CAP141-20 (wt %) | | 99 | 84 |
| Kane Ace ECO100 (wt %) | | 0 | 15 |
| Epoxidized octyl tallate (wt %) | | 1 | 1 |

TABLE 1

Opaque impact modified CAP materials

| Experiment/Composition | ASTM Method | Comp Ex 1 | Ex 1 | Ex 2 | Ex 3 | Ex 4 | Ex 5 | Ex 6 | Ex 7 | Ex 8 | Ex 9 |
|---|---|---|---|---|---|---|---|---|---|---|---|
| CAP 482-20 (wt %) | | 99 | 97 | 95 | 93 | 90 | 87 | 84 | 81 | 78 | 69 |
| Kane Ace 564 (wt %) | | 0 | 2 | 4 | 6 | 9 | 12 | 15 | 18 | 21 | 30 |
| Epoxide octyl tallate (wt %) | | 1 | 1 | 1 | 1 | 1 | 1 | 1 | 1 | 1 | 1 |
| Heat distortion temperature @0.455 Mpa (° C.) | D648 | 119.7 | 116.4 | 113.3 | 118.3 | 117.4 | 116.6 | 113.9 | 113.7 | 112.5 | 107.4 |
| Heat distortion temperature @1.82 Mpa (° C.) | | 105 | | | 100 | 100.3 | 100 | 95.5 | 96.3 | 95 | 90.2 |
| Izod Impact Strength @23° C. (J/m) | D256 | 79.8 | 181.4 | 183.5 | 201.6 | 201.2 | 201.6 | 202.7 | 181.4 | 166.6 | 180 |
| Izod Impact Strength @-40° C. (J/m) | | 58.9 | 121.1 | 117.3 | 105.45 | 88.11 | 80.15 | 101.04 | 115.5 | 95.32 | |

TABLE 2

Clear, UV resistant impact modified CAP materials

| Experiment/Composition | ASTM Method | Ex 10 | Ex 11 | Ex 12 | Ex 13 | Ex 14 | Ex 15 | Ex 16 | Ex 17 |
|---|---|---|---|---|---|---|---|---|---|
| CAP 482-20 (wt %) | | 97 | 95 | 93 | 90 | 87 | 84 | 81 | 78 |
| Kane Ace ECO100 (wt %) | | 2 | 4 | 6 | 9 | 12 | 15 | 18 | 21 |
| Epoxidized octyl tallate (wt %) | | 1 | 1 | 1 | 1 | 1 | 1 | 1 | 1 |
| Heat distortion temperature @0.455 Mpa (° C.) | D648 | 114.6 | 113.5 | 114.1 | 110.9 | 113 | 110.8 | 107.4 | 109.5 |
| Heat distortion temperature @1.82 Mpa (° C.) | | | | 98.9 | 97.5 | 99.2 | 96.9 | 95 | 93.9 |
| Izod Impact Strength @23° C. (J/m) | D256 | 161.8 | 192.4 | 198.9 | 216.6 | 215.7 | 230.2 | 199.1 | 180.4 |
| Izod Impact Strength @-40° C. (J/m) | | 105.8 | 122.1 | 75.4 | 71.5 | 74.6 | 96.9 | 80 | 88.6 |

TABLE 4-continued

High temperature impact modified CAP material

| Experiment/Composition | ASTM Method | Comp Ex 2 | Ex 24 |
|---|---|---|---|
| Heat distortion temperature @0.455 Mpa, (° C.) | D648 | 148.6 | 147.7 |
| Heat distortion temperature @1.82 Mpa, (° C.) | | 128.4 | 126.8 |
| Izod Impact Strength @23° C. (J/m) | D256 | 45.5 | 85.0 |
| Izod Impact Strength @−40° C. (J/m) | | 35.7 | 45.8 |

TABLE 5

CAP blended with a modified olefin impact modifier

| Experiment/Composition | ASTM Method | Ex 25 |
|---|---|---|
| CAP 482-20 (wt %) | | 84 |
| Lotader AX8900 (wt %) | | 15 |
| Epoxidized octyl tallate (wt %) | | 1 |
| Heat distortion temperature @0.455 Mpa, (° C.) | D648 | 97.2 |
| Heat distortion temperature @1.82 Mpa, (° C.) | | 115.1 |
| Izod Impact Strength @23° C., (J/m) | D256 | 117 |
| Izod Impact Strength @−40° C., (J/m) | | |

Melt Processibility of Example 12

The flow behavior of Example 12 from Table 2 above was compared to typical plastic material using a spiral flow test. The spiral flow test was conducted filing a 0.5" wide×0.125" thick spiral flow mold with molten material using a Toyo 110 ton machine with an injection pressure of 1000 psi, injection speed of 1.0" per second, fill time of 10 second, screw speed of 150 rpm, back pressure of 100 psi, cooling time of 22 seconds. The flow length is the length of the spiral of each material molded at a specific barrel temperature under the same molding conditions.

Spiral Flow was first run to determine the flow length values of certain polymeric materials. The materials used were Makrolon 2458 polycarbonate (PC) from Covestro, Lustran SAN 31 (styrene-acrylonitrile or SAN) from INEOS, and Terluran GP22NR ABS from INEOS. These materials were run at processing temperatures, as shown in table 6 below.

Comparative Example 3

Comp. Ex 3 was prepared from Eastman™ cellulose acetate propionate 482-20 (88 wt %) and dioctyl adipate plasticizer (12 wt %) by adapting the previously described procedures.

In addition to the materials discussed above, spiral flow was determined for example 12 and comparative example 3. These materials were run at processing temperatures, as shown in table 6.

TABLE 6

Spiral Flow Length

| Material | Barrel Set Point ° F./° C. | Spiral Flow Avg. Fill (inches) |
|---|---|---|
| ABS | 460/238 | 21.75 |
| ABS | 480/249 | 25 |
| ABS | 500/260 | 28.75 |
| SAN | 420/216 | 15 |
| SAN | 440/227 | 18.75 |
| SAN | 460/238 | 22.25 |
| SAN | 480/249 | 25.75 |
| PC | 500/260 | 7 |
| PC | 520/271 | 10.5 |
| PC | 540/282 | 13.75 |
| PC | 560/293 | 17 |
| Ex 12 | 480/249 | 27.25 |
| Ex 12 | 460/238 | 22 |
| Ex 12 | 440/227 | 17.25 |
| Comp. Ex 3 | 400/204 | 25 |
| Comp. Ex 3 | 420/216 | 32 |
| Comp. Ex 3 | 440/227 | 38 |

A review of table 6 reveals that the flow length values of the commercial materials is between 10 and 30 inches. The spiral flow of example 12 shows that the composition has very good flow (similar to ABS and SAN and better than PC) indicating that the examples of the invention can be melt processed in injection molding and other processes. The spiral flow length of comparative example 3 (fully plasticized CAP with no impact modifier) was the highest.

Light Transmission of Comparative Ex 1 and Ex 12

Pellets of comparative example 1 and example 12 were injection molded in a 150 Ton Toyo injection molding machine with a barrel capacity of 6.7 oz at 1 in/sec injection speed into two 4 inch×4 inch×0.126 (10.2 cm×10.2 cm×0.32 cm) plaques per shot with barrel temperature nominally of 249° C. (480° F.) with a residence time of 2 min or 5 min, and a mold temperature of 80° C. Light transmission was measured on the plaques molded at 2 and 5 minutes (residence time) according to ASTM D1003a. The results are shown below in Table 7.

TABLE 7

Light Transmission Test Results

| | CEX 1 | EX 12 |
|---|---|---|
| Molding observations at 249 C. | Squeaking and poor screw recovery | No issues |
| Transmission at 2 minute residence time | 92.2 | 82.4 |
| Transmission at 5 minute residence time | 90.4 | 79.8 |
| Haze at 2 minute residence time | 2.1 | 10.8 |
| Haze at 5 minute residence time | 2.5 | 9.7 |

In examples 26-30, cellulose ester compositions were prepared by compounding CAP 482-20 with additional impact modifiers, including several block copolymer thermoplastic elastomers, and an ABS core-shell impact modifier. The compounding of the cellulose ester compositions was conducted on a Leistritz 18 mm (50:1 L/D ratio) twin screw extruder at a throughput of 18 lbs/hour with screw speed of 250 rpm and barrel temperature of 220° C. The barrel temperatures were 230° C. for compounding CA and CAP141-20 based compositions. The compounded material was then injection molded into 3.2 mm thick by 12.8 mm wide bars on a Toyo 110 Ton injection molding machine with barrel temperature of 240 C and mold temperature of 70 C. Properties for these compositions are compared to comparative example 1 in Table 8.

Glass transition temperature (Tg) was measured according to ASTM Standard Method D3418, where the sample is heated from −100° C. at a heating rate of 20° C./min. DSC scans of blends of materials may show multiple Tg transitions. If more than one Tg transition was determined during the scan, the matrix glass transition is defined as the highest Tg measured during the scan.

Notched Izod Impact Strength was performed on 3.2 mm thick molded bars at 230 C after notching according to ASTM Method D256, after conditioning the bars at 230° C. and 50% RH for 48 hours.

TABLE 8

CAP blended with selected block copolymer impact modifiers or an ABS core shell impact modifier

| Experiment/Composition | CEx 1 | Ex 26 | Ex 27 | Ex 28 | Ex 29 | Ex 30 |
| --- | --- | --- | --- | --- | --- | --- |
| CAP141-20 (wt %) | 100 | 90 | 90 | 90 | 90 | 70 |
| Blendex 338 ABS core shell impact modifier (wt %) | | 10 | | | | 30 |
| Kraton FG1924 G SEBS block copolymer (wt %) | | | 10 | | | |
| Estane ALR 72A TPU block copolymer (wt %) | | | | 10 | | |
| Hytrel 3078 polyester-ether block copolymer (wt %) | | | | | 10 | |
| Glass Transition Temperature (Tg in ° C.) | 147 | 142 | 142 | 142 | 141 | 139 |
| Izod Impact Strength @23° C. (J/m) | 79.8 | 210 | 379 | 316 | 219 | 226 |

The above detailed description of embodiments of the disclosure is intended to describe various aspects of the invention in sufficient detail to enable those skilled in the art to practice the invention. Other embodiments can be utilized and changes can be made without departing from the scope of the invention. The above detailed description is, therefore, not to be taken in a limiting sense. The scope of the present invention is defined only by claims presented in subsequent regular utility applications, along with the full scope of equivalents to which such claims are entitled.

In this description, references to "one embodiment," "an embodiment," or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, step, etc. described in one embodiment may also be included in other embodiments, but is not necessarily included. Thus, the present technology can include a variety of combinations and/or integrations of the embodiments described herein.

That which is claimed is:

1. A cellulose ester composition comprising 55 to 99 wt % of at least one cellulose ester, 1 to 30 wt % of at least one impact modifier, and 1 to 15 wt % of at least one plasticizer, based on the total weight of the composition, wherein the at least one cellulose ester is a cellulose acetate, wherein the composition has an HDT value greater than 95° C., and a notched Izod impact strength value greater than 80 J/m measured according to ASTM D256 on 3.2mm thick bars at 23° C., after conditioning the bars at 230° C. and 50% RH for 48 hours;

wherein the impact modifier is a block copolymer in which at least one segment of the block copolymer has a glass transition temperature ("$T_g$") that is below room temperature and at least one segment of the block copolymer has a $T_g$ or a melting point ("$T_m$") that is above room temperature and wherein the block copolymer is one or more thermoplastic elastomers chosen from a styrenic elastomer selected from the group consisting of styrene-butadiene-styrene (SBS), styrene-ethylene-butylene-styrene (SEBS), styrene-isoprene (SIS), thermoplastic urethanes (TPUs), polyester-ether copolymers, or polyamide-ether copolymers.

2. The cellulose ester composition of claim 1, wherein the cellulose acetate has an absolute weight average molecular weight of 5000-40000.

3. The cellulose ester composition of claim 1, wherein the cellulose acetate has an absolute weight average molecular weight of 70000-120000.

4. The cellulose ester composition according to claim 1, wherein said composition comprises plasticizer selected from the group consisting of triacetin, trimethyl phosphate, triethyl phosphate, tributyl phosphate, triphenyl phosphate, triethyl citrate, acetyl trimethyl citrate, acetyl triethyl citrate, acetyl tributyl citrate, tributyl-o-acetyl citrate, dibutyl phthalate, diaryl phthalate, diethyl phthalate, dimethyl phthalate, di-2-methoxyethyl phthalate, di-octyl phthalate, di-octyl adipate, dibutyl tartrate, ethyl o-benzoylbenzoate, ethyl phthalyl ethyl glycolate, methyl phthalyl ethyl glycolate, n-ethyltoluenesulfonamide, o-cresyl p-toluenesulfonate, aromatic diol, substituted aromatic diols, aromatic ethers, tripropionin, tribenzoin, polycaprolactone, glycerin, glycerin esters, diacetin, glycerol acetate benzoate, polyethylene glycol, polyethylene glycol esters, polyethylene glycol diesters, di-2-ethylhexyl polyethylene glycol ester, triethylene glycol bis-2-ethyl hexanoate, glycerol esters, diethylene glycol, polypropylene glycol, polyglycoldiglycidyl ethers, dimethyl sulfoxide, N-methyl pyrollidinone, C1-C20 dicarboxylic acid esters, dimethyl adipate, di-butyl maleate, di-octyl maleate, resorcinol monoacetate, catechol, catechol esters, phenols, epoxidized soy bean oil, castor oil, linseed oil, epoxidized linseed oil, other vegetable oils, other seed oils, difunctional glycidyl ether based on polyethylene glycol, γ-valerolactone, alkylphosphate esters, aryl phosphate esters, phospholipids, eugenol, cinnamyl alcohol, camphor, methoxy hydroxy acetophenone, vanillin, ethylvanillin, 2-phenoxyethanol, glycol ethers, glycol esters, glycol ester ethers, polyglycol ethers, polyglycol esters, ethylene glycol ethers, propylene glycol ethers, ethylene glycol esters, propylene glycol esters, polypropylene glycol esters, acetylsalicylic acid, acetaminophen, naproxen, imidazole, triethanol amine, benzoic acid, benzyl benzoate, salicylic acid, 4-hydroxybenzoic acid, propyl-4-hydroxybenzoate, methyl-4-hydroxybenzoate, ethyl-4-hydroxybenzoate, benzyl-4-hydroxybenzoate, diethylene glycol dibenzoate, dipropylene glycol dibenozoate, triethylene glycol dibenzoate, butylated hydroxytoluene, butylated hydroxyanisol, sorbitol, xylitol, ethylene diamine, piperidine, piperazine, hexamethylene diamine, triazine, triazole, pyrrole, and any combination thereof.

5. The cellulose ester composition according to claim 1, wherein said impact modifier has a refractive index of 1.46-1.50.

6. The cellulose ester composition according to claim 1, wherein said impact modifier has particle size of 0.01-2.0 um.

7. The cellulose ester composition according to claim 1, wherein the cellulose ester composition further comprises at least one additional polymeric component in an amount from 5 to 95% weight %, based on the total cellulose ester composition.

8. The cellulose ester composition according to claim 7, wherein the at least one additional polymeric component is selected from the group consisting of polyesters; polyamides; other cellulose esters, cellulose ethers; poly(methylmethacrylate); acrylic copolymers; poly(ether-imides); poly (ester-carbonates); polycarbonates; polylactic acid; polybutylenesuccinate; or mixtures.

9. The cellulose ester composition according to claim 1, wherein said composition further comprises at least one additive selected from the group consisting of antioxidants, thermal stabilizers, mold release agents, antistatic agents, whitening agents, colorants, plasticizers, minerals, UV stabilizers, lubricants, nucleating agents, reinforcing fillers, glass fiber, carbon fiber, flame retardants, dyes, pigments, colorants, additional resins and combinations thereof.

10. An article of manufacture comprising the cellulose ester composition according to claim 1, wherein the composition has a notched Izod impact strength of at least 150 J/m.

11. The article according to claim 10, wherein the article of manufacture is formed by injection molding.

12. A film or sheet comprising a cellulose ester composition according to claim 1.

* * * * *